Dec. 8, 1942.　　　N. J. TRIOLO　　　2,304,430

BICYCLE ATTACHMENT

Filed June 28, 1941

Nathan J. Triolo
INVENTOR

BY Victor J. Evans & Co.
ATTORNEY

Patented Dec. 8, 1942

2,304,430

UNITED STATES PATENT OFFICE 2,304,430

BICYCLE ATTACHMENT

Nathan J. Triolo, Mamaroneck, N. Y., assignor to George Kleiman, New York, N. Y.

Application June 28, 1941, Serial No. 400,330

3 Claims. (Cl. 115—27)

This invention relates to a bicycle attachment or a pontoon arrangement to travel on water employing a conventional type of bicycle as a means for driving the propeller thereof with ease and comfort to the operator and permitting maximum speed to be maintained on the water and has for the primary object the provision of a device of the above stated character which will be simple, durable and safe and which may be manufactured at a low cost and is so constructed that a conventional bicycle may be easily and quickly installed and removed therefrom.

With these and other objects in view this invention consists in certain novel features of construction, combination and arrangement of parts to be hereinafter fully described and claimed.

For a complete understanding of my invention, reference is to be had to the following description and accompanying drawing, in which Figure 1 is a top plan view illustrating a bicycle attachment constructed in accordance with my invention.

Figure 1:
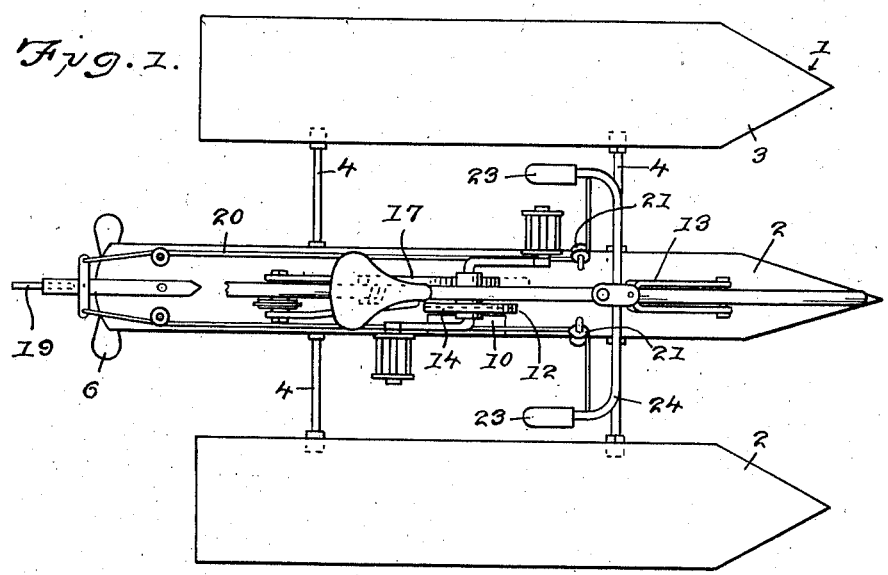
Figure 2:
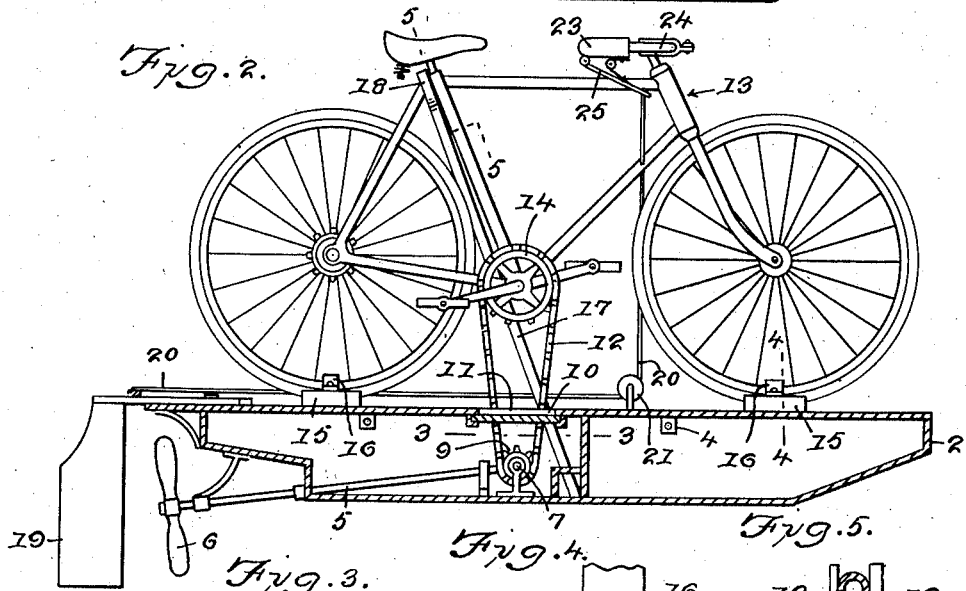
Figure 2 is a side elevation, partly in section, illustrating the same.
Figure 3:
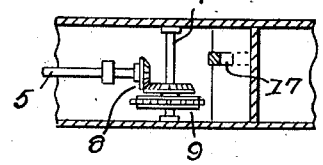
Figure 3 is a sectional view taken on the line 3—3 of Figure 2.
Figures 4, 5:
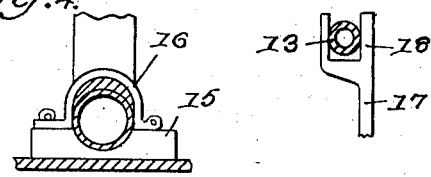
Figure 4 is a sectional view taken on the line 4—4 of Figure 2.
Figure 5 is a sectional view taken on the line 5—5 of Figure 2.

Referring in detail to the drawing, the numeral 1 indicates a water craft consisting of intermediate and side pontoons 2 and 3, respectively, anchored together by braces or rods 4. The pontoons at the front ends thereof are preferably pointed to reduce water resistance and the side pontoons act as stabilizers for the intermediate pontoon which carries the propelling and steering mechanism.

A propeller shaft 5 is rotatably supported by the pontoon 2 and carries at its rear end a propeller 6 while the forward end of the shaft is disposed within the pontoon 2 and is connected to a shaft 7 by gears 8. The shaft 7 is suitably journaled to the pontoon and arranged transversely thereof and has secured thereto a sprocket gear 9 disposed under an opening 10 in the top wall of the pontoon. The opening 10 may be partially closed by a slide 11 having a slot to permit a sprocket chain 12 to extend therethrough and which is trained over the sprocket gear 9. The sprocket chain 12 may be the usual chain used between the pedals and rear wheel of a bicycle and when a bicycle 13 is mounted upon the pontoon 2 the sprocket chain is left on the sprocket gear 14 of the bicycle and passed down through the slot in the slide 11 and over the sprocket gear 9 thus connecting the pedals of the bicycle to the pedal shaft for driving the propeller.

Spaced anchoring blocks 15 are secured to the pontoon 2 and are grooved to receive the tires of the bicycle and each are equipped with a clamp 16 for detachably securing the respective wheels of the bicycle to the blocks.

An upwardly and rearwardly extending brace or support 17 is carried by the pontoon 2 and has its upper end forked, as shown at 18, to receive the bicycle frame directly under the seat of the bicycle for cooperating with the bearing blocks in supporting the bicycle in a vertical position and against tilting movement.

A rudder 19 is carried by the rear end of the pontoon 2 and has connected thereto cables 20 trained over pulleys 21 on the pontoon 2. The cables extend to hand grips 23 mounted on the handle bars 24 of the bicycle. The hand grips each include a pivoted and spring-pressed finger piece 25 connected to the cables whereby the rider of the bicycle may by manipulating the finger pieces actuate the rudder in different directions to bring about the steering of the craft in a desired direction.

While I have shown and described the preferred embodiment of my invention, it will be understood that minor changes in construction, combination and arrangement of parts may be made without departing from the spirit and scope of my invention, as claimed.

Having described the invention, I claim:

1. In a water craft of the character described, a pontoon, a propeller shaft rotatably mounted on the pontoon, a propeller secured to the outer end of the said shaft, drive gearing including a sprocket connected to the inner end of the shaft, a rudder mounted on the pontoon, a bicycle having the wheels detachably fastened on the pontoon, the said bicycle having a sprocket driven chain trained over the sprocket of the propeller driving gear for rotating the propeller shaft, a spring-pressed operating element pivotally connected to each handle bar grip of the bicycle and yieldingly urged to a downwardly inclined position thereunder, and a cable attached to each operating element and to the rudder for turning the rudder upon upward swinging movement of the respective operating elements.

2. A water craft comprising intermediate and side pontoons, means for connecting said pontoons, a propeller shaft carried by the intermediate pontoon, a propeller secured to said shaft, a rudder carried by the intermediate pontoon, means for mounting a bicycle to the intermediate pontoon and connecting the sprocket chain thereof to said shaft for operating the propeller, cables connected to the rudder, guide pulleys for said cables and carried by the intermediate pontoons, hand grips on the handle bars of the bicycle and connected to the cables and each including pivotally mounted and spring-pressed finger pieces whereby the rider of the bicycle may turn the rudder in either direction.

3. A water craft of the character described comprising a pontoon, a propeller shaft mounted on the pontoon having a propeller secured to its outwardly projecting end portion, drive gearing including a vertically arranged sprocket having connection with the inner end of the said shaft, a rudder mounted on the rear end portion of the pontoon, a bicycle having the wheels detachably fastened on the pontoon, a brace bar secured to the intermediate portion of the pontoon and extending thereabove, the upper end of the said brace bar having a forked portion engaging the upper portion of the bicycle frame to rigidly hold the bicycle in upstanding position, the said bicycle having a sprocket driven chain trained over the sprocket of the propeller drive gearing for rotating the propeller shaft, an operating element pivotally connected to each hand grip of the bicycle handle bar at the underside thereof, spring means resiliently pressing each operating element to a downwardly inclined position, and a cable attached to the free end of each operating element and to the rudder for turning the rudder upon elevation of either of the said operating elements.

NATHAN J. TRIOLO.